United States Patent
Takahashi et al.

(10) Patent No.: US 6,659,678 B2
(45) Date of Patent: Dec. 9, 2003

(54) MECHANISM FOR KEEPING LOCK DEVICE RELEASED

(75) Inventors: Kazuyoshi Takahashi, Koto-ku (JP); Atsushi Tamai, Kitasoma-gun (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/090,793

(22) Filed: Mar. 6, 2002

(65) Prior Publication Data

US 2002/0127052 A1 Sep. 12, 2002

(30) Foreign Application Priority Data

Mar. 8, 2001 (JP) ........................................ 2001-065407

(51) Int. Cl.[7] ............................................... F16B 21/00
(52) U.S. Cl. .......................... 403/322.1; 403/6; 403/20; 403/31; 403/379.2; 403/DIG. 4
(58) Field of Search ................................ 403/6, 15, 19, 403/20, 109.8, 321, 322.1, 325, 326, 330, 379.2, 327, 31, 33, DIG. 4, 315

(56) References Cited

U.S. PATENT DOCUMENTS

| | | | | | |
|---|---|---|---|---|---|
| 3,468,579 | A | * | 9/1969 | Tabor | 292/306 |
| 5,501,543 | A | * | 3/1996 | Schluter-Wohlfeil | 403/321 |
| 5,928,290 | A | * | 7/1999 | Gramnas | 623/33 |
| 6,059,531 | A | * | 5/2000 | Tai | 416/220 A |
| 6,082,503 | A | * | 7/2000 | Magrini | 188/67 |

* cited by examiner

Primary Examiner—Lynne H. Browne
Assistant Examiner—Kenneth L Thompson
(74) Attorney, Agent, or Firm—Paul A. Guss

(57) ABSTRACT

A mechanism for keeping a lock device released comprises a through-hole which is defined through a side surface of an intermediate block member having a lock device and which externally communicates, a hexagon wrench which is inserted externally through the through-hole and which is connected to a lock plate, and a plate spring which fastens the hexagon wrench with the lock being released by moving the lock plate upwardly with the hexagon wrench.

14 Claims, 9 Drawing Sheets

MECHANISM FOR KEEPING LOCK DEVICE RELEASED

BACKGROUND OF THE INVENTION

1. Field of the Invention

The present invention relates to a mechanism for keeping a lock device released from a movable member, the lock device being disposed in a cylinder or the like.

2. Description of the Related Art

A brake-equipped fluid pressure cylinder has conventionally had a lock device for holding a piston. A brake-equipped clamp unit has conventionally had a lock device for keeping a workpiece fixed by an arm. It is necessary for the brake-equipped fluid pressure cylinder and the brake-equipped clamp unit to temporarily release a lock device and to manually operate a workpiece upon a set up in an initial state or in an emergency.

The conventional lock device attached to the brake-equipped fluid pressure cylinder and the brake-equipped clamp unit includes means for releasing the lock. However, the conventional lock device does not include any mechanism for keeping the lock released. Therefore, the operability is unsatisfactory and is complicated in the emergency or maintenance.

Specifically, the lock device pressed by a spring or the like is manually operated against the spring for releasing the lock device. Then, an operator needs to manually operate the lock device for releasing the lock so that the spring force cannot operate the lock device because no mechanism is disposed for keeping the lock device released.

In other words, the conventional lock device attached to the brake-equipped fluid pressure cylinder and the brake-equipped clamp unit can temporarily release the lock. However, no mechanical means is disposed for keeping the lock device released for a desired period of time. Therefore, the operator prevents the conventional lock device from operating with one hand against the spring force.

SUMMARY OF THE INVENTION

It is a general object of the present invention to provide a mechanism which can keep a lock device released with a simple and convenient structure.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
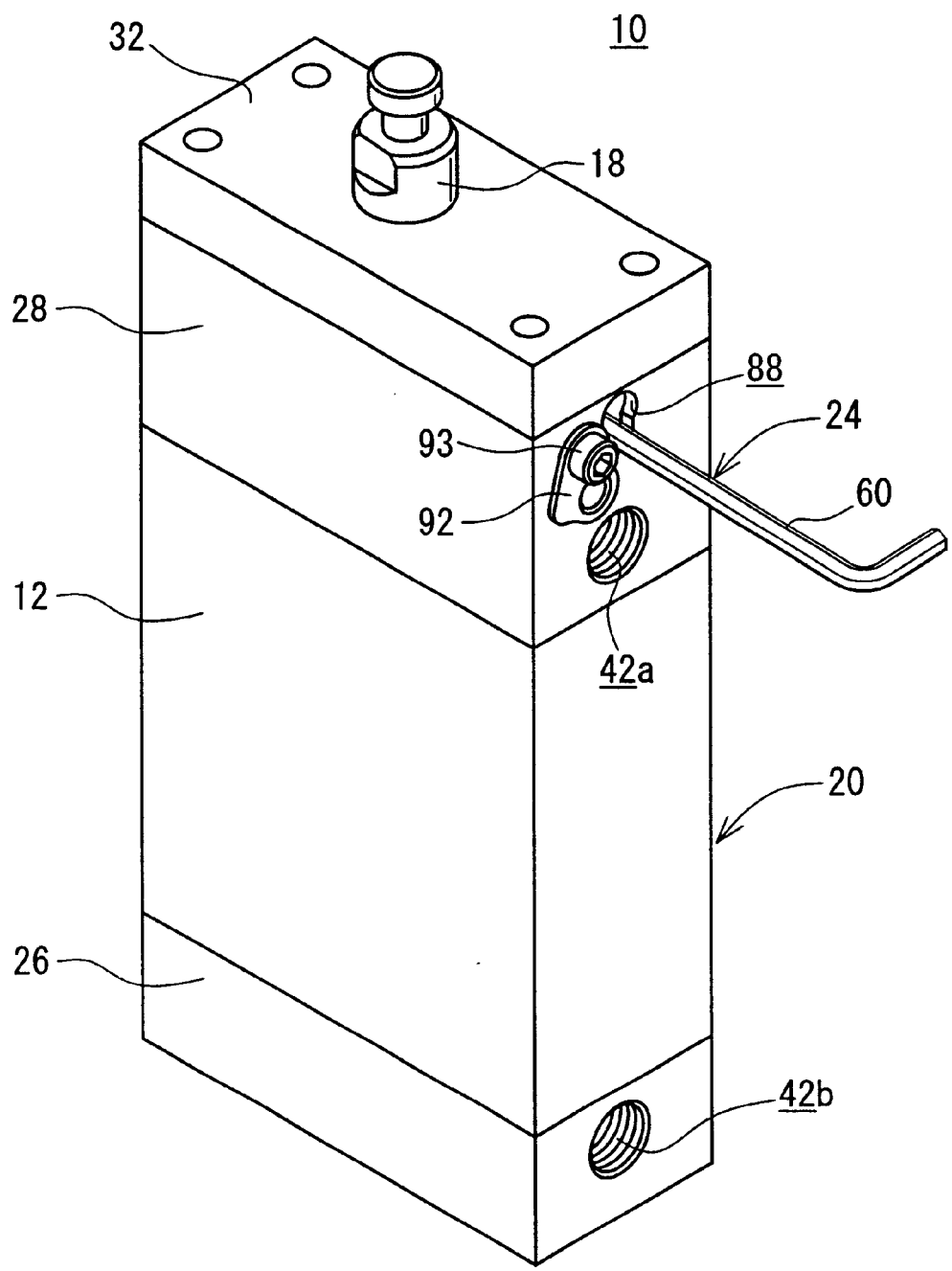
FIG. 1 is a perspective view of a cylinder apparatus incorporating a mechanism for keeping a lock device released according to an embodiment of the present invention.

In FIGS. 1 to 5, reference numeral 10 indicates a cylinder apparatus incorporating a mechanism for keeping a lock released according to an embodiment of the present invention.

The cylinder apparatus 10 comprises a cylinder mechanism 20, a lock device 22 (see FIGS. 3 to 5) which keeps the piston rod 18 at a predetermined position by fastening the outer circumferential surface of the piston rod 18, and a mechanism 24 which keeps the lock device 22 released from the piston rod 18. The cylinder mechanism 20 includes a piston 16 accommodated in a cylinder chamber 14 of a cylinder tube 12 and a piston rod 18 moving together with the piston 16.

Figure 3:
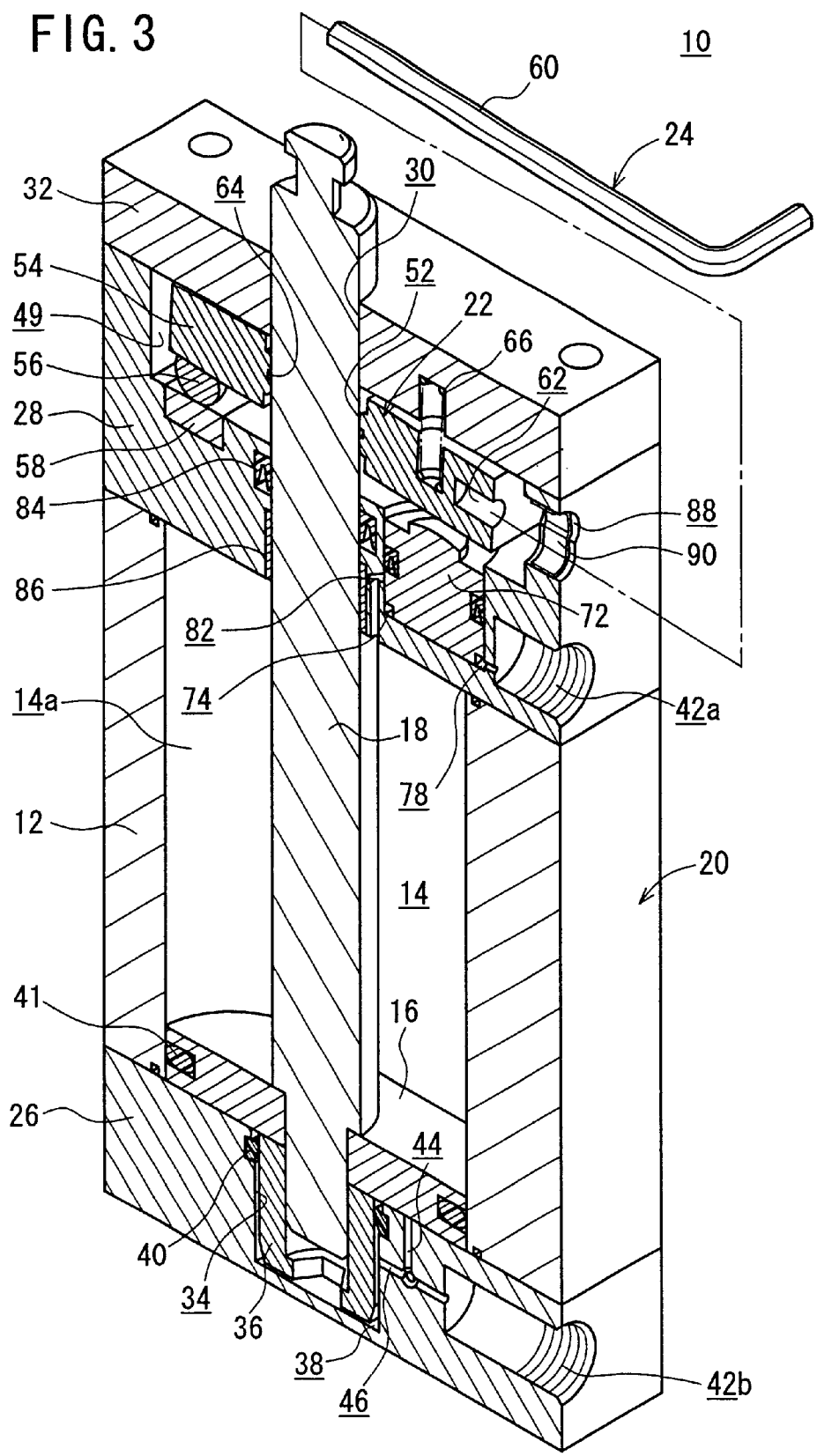
FIG. 3 is an axially vertical sectional view of FIG. 1.
Figure 4:
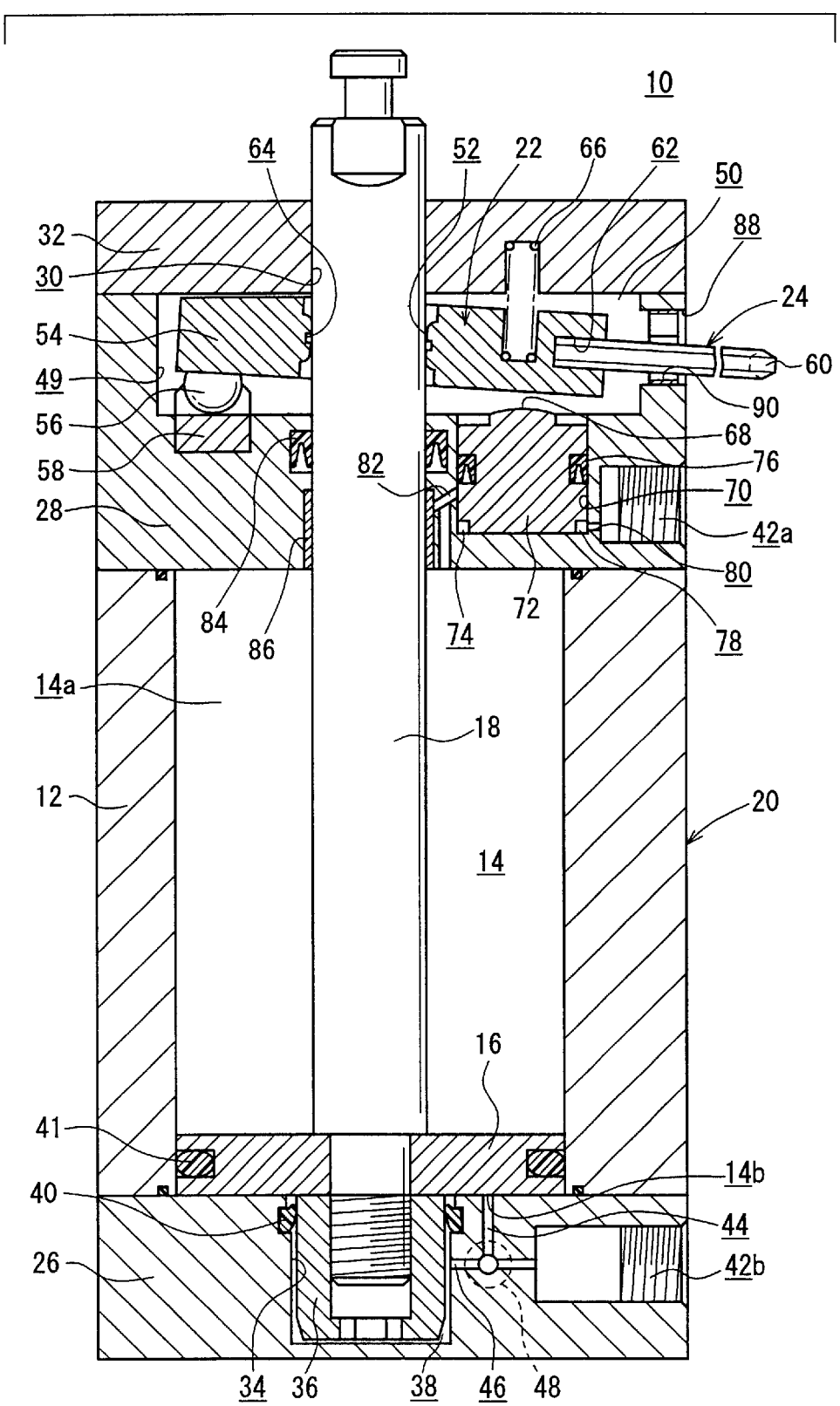
FIG. 4 is a vertical sectional view showing that a lock plate of a lock device is inclined downward to the right to fasten a piston rod.
Figure 5:
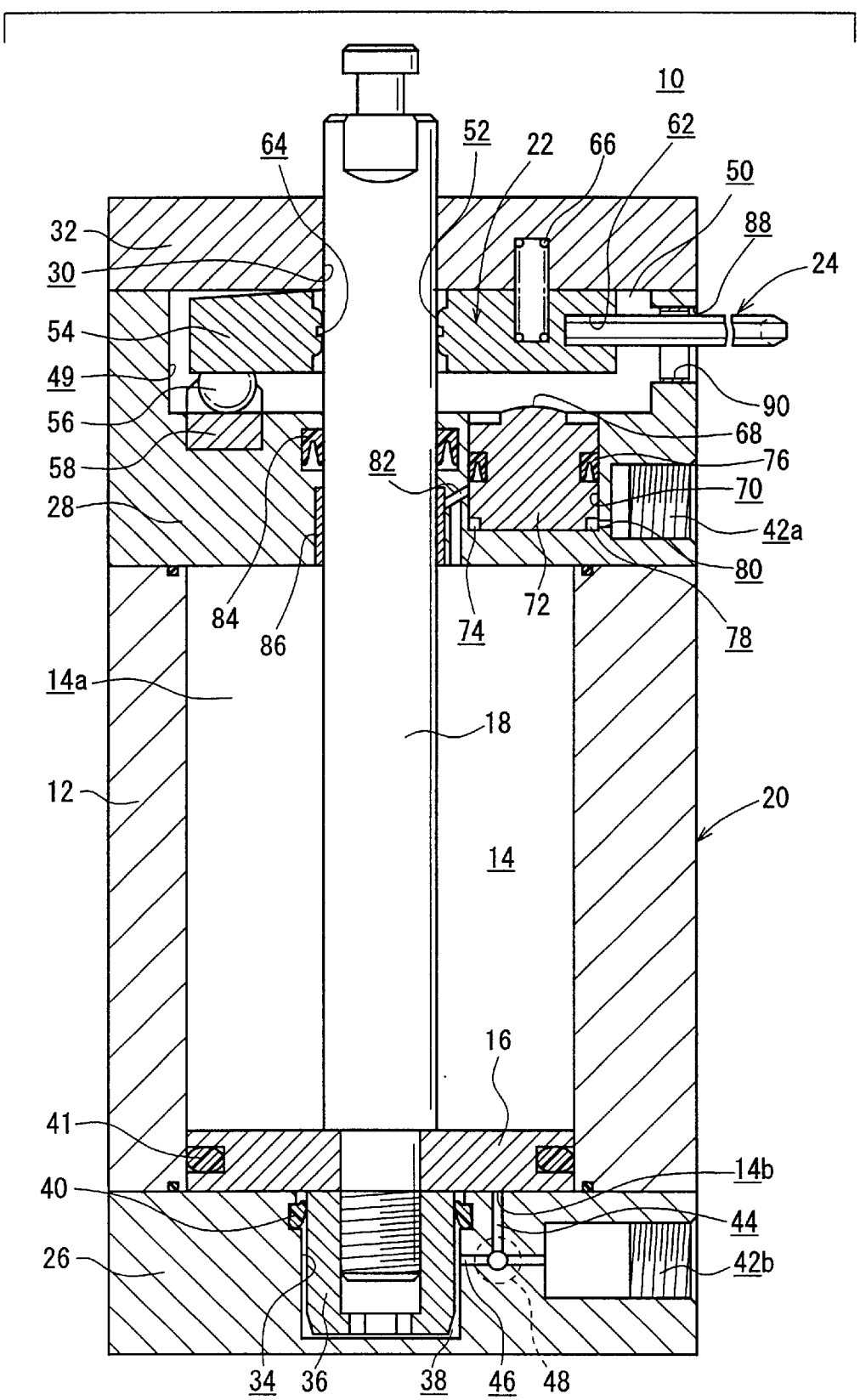
FIG. 5 is a vertical sectional view showing the lock device shown in FIG. 4 is kept released.

As shown in FIGS. 3 and 4, the cylinder mechanism 20 includes an end block 26 and an intermediate block member (casing) 28 which form an upper cylinder chamber 14a and a lower cylinder chamber 14b, and an end plate 32 which is connected continuous to the upper surface of the intermediate block member 28 and which has a through-hole 30 for inserting the piston rod 18. The upper cylinder chamber 14a and the lower cylinder chamber 14b are closed by both axial ends of the cylinder tube 12.

The cylinder mechanism 20 further includes the piston 16 having an elliptic cross section, the piston rod 18, a cushion ring 36 and a seal ring 40. The piston 16 is accommodated in the cylinder tube 12 and reciprocates along the cylinder chamber 14. The piston rod 18 is connected centrally to the piston 16 and moves together with the piston 16. The cushion ring 36 is connected to the end of the piston rod 18 and enters a recess 34 defined centrally at the end block 26 to effect the buffering action at the displacement terminal end of the piston by a compressed air. The seal ring 40 is installed upwardly of the recess 34 and surrounds the outer circumferential surface of the cushion ring 36 to define a cushion chamber 38. The cushion chamber 38 is closed in the recess 34.

The cross section of the piston rod 18 perpendicular to the axis is circular. A piston packing 41 is installed to the outer circumferential surface of the piston 16.

A pair of pressure fluid inlet/outlet ports 42a, 42b, which introduce and discharge the pressure fluid (for example, compressed air) with respect to the cylinder chamber 14, are formed in the intermediate block member 28 and the end block 26. The lower pressure fluid inlet/outlet port 42b communicates the lower cylinder chamber 14b through a first passage 44. Further, the lower pressure fluid inlet/outlet port 42b communicates the cushion chamber 38 of the end block 26 through a second passage 46 branched from a middle of the first passage 44. A needle valve 48 is disposed at a branching point of the first passage 44 and the second passage 46 in a direction perpendicular to the plane of paper of FIG. 4. The needle valve 48 adjusts the discharged flow rate of the air compressed in the cushion chamber 38 and discharged externally when the cushion ring 36 enters the recess 34 of the end block 26.

As shown in FIG. 4, the lock device 22 includes a lock plate (lock member) 54, a support point pin 56 and a holding member 58. The lock plate 54 is disposed in a chamber 50 closed between the end plate 32 and a recess 49 defined in the intermediate block member 28. Further, the lock plate 54 is externally fitted to the piston rod 18 by a hole 52 having a circular cross section slightly larger than that of the piston rod 18. The support point pin 56 supports one end of the lock plate 54. The holding member 58 is secured to the recess 49 of the intermediate block member 28 and holds the support point pin 56. An inserting hole 62 is defined at a side surface of the lock plate 54. One end of a L-shaped hexagon wrench 60 described later on is inserted into the inserting hole 62.

The inner circumferential surface of the hole 52 of the lock plate 54 has a vertical cross section of a circular arc shape. An annular groove 64 is defined centrally at the inner circumferential surface of the hole 52. The annular groove 64 serves as a release groove for the lubricating oil applied to the outer surface of the piston rod 18.

The lock device 22 further includes a spring 66, a release piston 72 and a pressure chamber 74. The spring 66 is interposed between the intermediate block member 28 and the lock plate 54. Further, the spring 66 presses the lock plate 54 toward the intermediate block member 28. The release piston 72 has a projection 68 at its upper surface for abutting against the lock plate 54. Further, the release piston 72 is displaced along a hole 70 of the intermediate block member 28. The pressure chamber 74 is closed by the release piston 72. The pressure fluid is supplied from the pressure fluid inlet/outlet port 42a into the pressure chamber 74.

When the lock plate 54 is inclined by a predetermined angle downward to the right about the support point of the support point pin 54, the piston rod 18 and the hole 52 are engaged with each other for enabling the nipping action therebetween to increase. Thus, the lock plate 54 locks the piston rod 18 so that the piston rod 18 cannot downwardly move. When the lock plate 54 is made horizontal against the spring force of the spring 66 under the pressing action of the release piston 72, the lock plate 54 can be released from the piston rod 18. Therefore, the piston rod 18 freely moves downwardly.

A piston packing 76 is installed to an annular groove of the release piston 72. An annular cutout 78 is defined at the circumferential bottom surface of the release piston 72.

A third passage 80 provides communication between the pressure chamber 74 and the upper pressure fluid inlet/outlet port 42a. The third passage 80 can press the release piston 72 upwardly by supplying the pressure fluid to the annular cutout 78 even if the release piston 72 is seated in the hole 70.

Further, a fourth passage 82 provides communication between the pressure chamber 74 and the upper cylinder chamber 14a. The fourth passage 82 is inclined by a predetermined angle downward to the left. As shown in FIG. 4, when the release piston 72 is seated in the hole 70, the fourth passage 82 is closed by the outer circumferential surface of the release piston 72. Consequently, the pressure chamber 74 and the upper cylinder chamber 14a are prevented from communicating with each other. Therefore, the pressure fluid introduced into the pressure chamber 74 is not supplied into the upper cylinder chamber 14a.

By contrast, when the release piston 72 moves upwardly, the pressure chamber 74 communicates the upper cylinder chamber 14a through the fourth passage 82. The pressure fluid is introduced into the pressure chamber 74 and is supplied into the upper cylinder chamber 14a.

A rod packing 84 and a bush 86 are installed to the inner circumferential surface of the through-hole defined centrally at the intermediate block member 28. The rod packing 84 surrounds the outer circumferential surface of the piston rod 18. The bush 86 linearly guides the piston rod 18.

The mechanism 24 includes a through-hole (manual operation hole) 88 having a composite circular cross section, an annular plate spring (fastening member) 90 and the hexagon wrench (connecting member) 60. The through-hole 88 is defined through the side surface of the intermediate block member 28 serving as the casing. The annular plate spring (fastening member) 90 is disposed along and fastened to the inner wall surface of the through-hole 88. The hexagon wrench (connecting member) 60 has one end inserted into the inserting hole 62 of the lock plate 54. The hexagon wrench 60 is inserted externally along the through-hole 88.

The connecting member is not limited to the hexagon wrench 60. The connecting member may be an unillustrated rod which can be inserted into the inserting hole 62 of the lock plate 54 externally through the through-hole 88 and which can be used to operate the lock plate 54 against the spring force of the spring 66. Alternatively, an unillustrated projection exposed externally through the through-hole 88 may be formed continuous with the lock plate 54.

Figure 2:
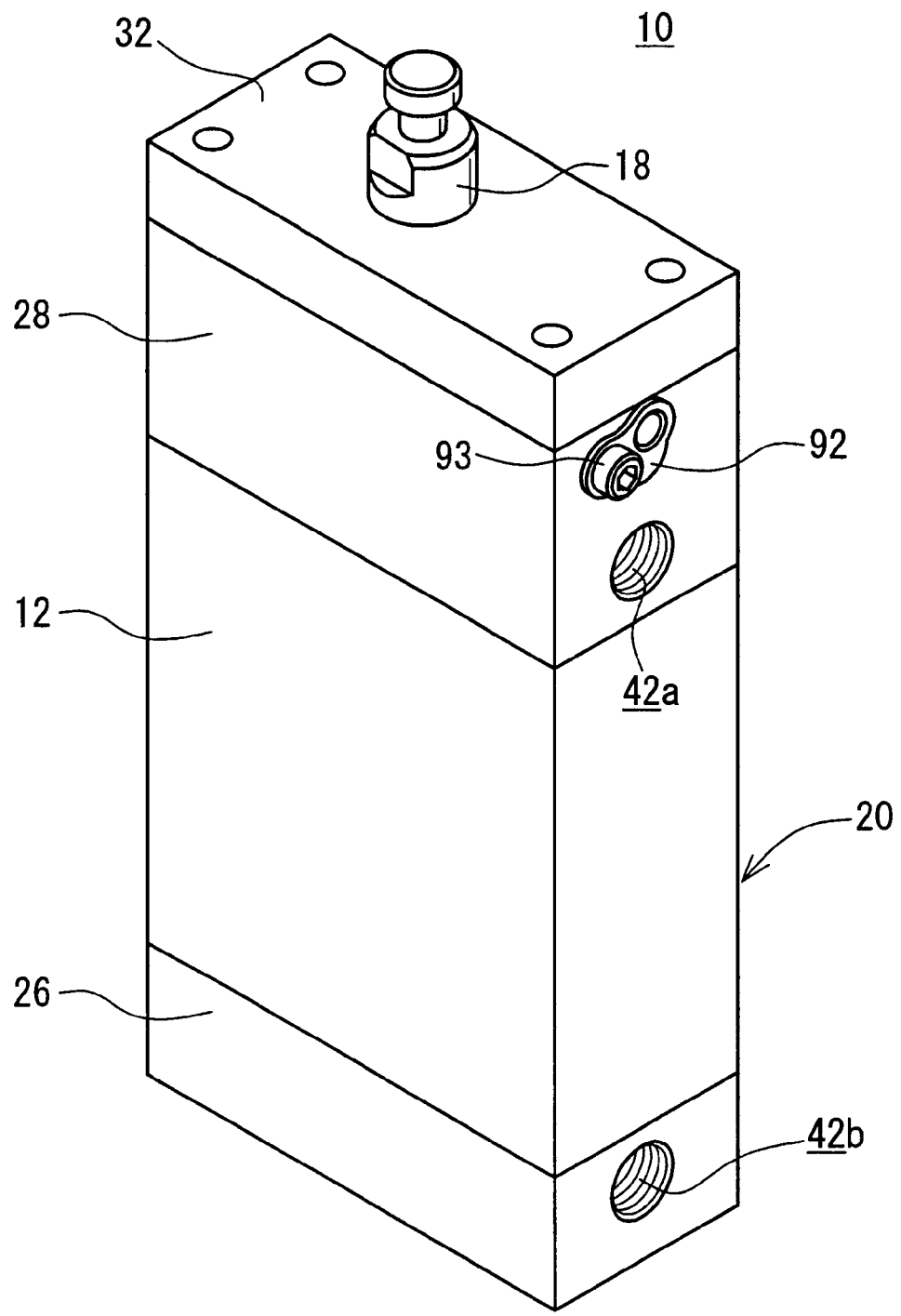
FIG. 2 is a perspective view showing that a hexagon wrench shown in FIG. 1 is disengaged and a through-hole of an intermediate block member is closed by a dust-preventive cover.

As shown in FIGS. 1 and 2, a dust-preventive cover 92 and a bolt 93 are disposed on the side surface of the intermediate block member 28. The dust-preventive cover 92 closes the through-hole 88 for preventing dust or the like from invading into the chamber 50 of the intermediate block member 28. The bolt 93 fastens the dust-preventive cover 92 to the intermediate block member 28. When the bolt 93 is loosened to rotate the dust-preventive cover 92, the through-hole 88 is exposed which is defined on the side surface of the intermediate block member 28.

Figure 6:
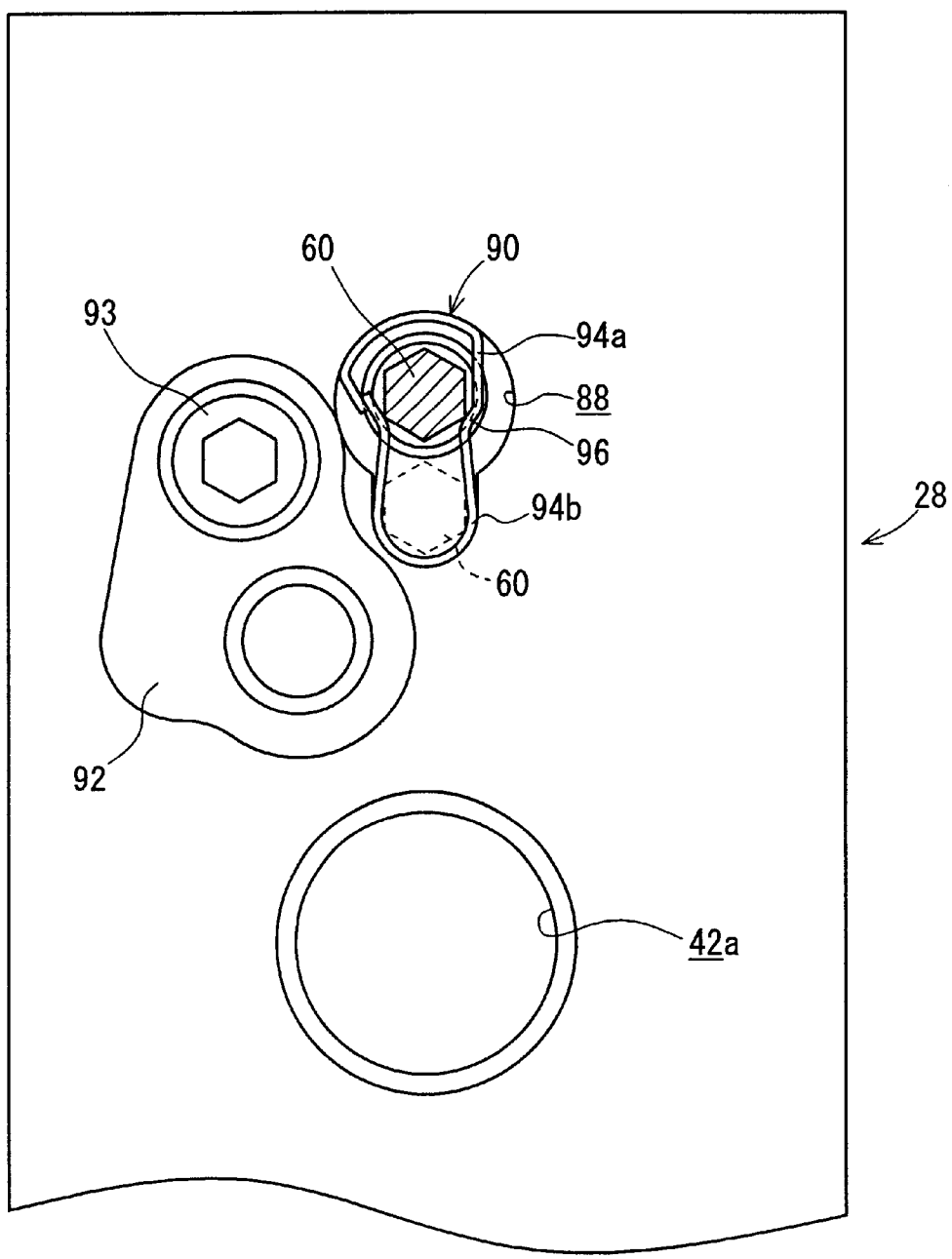
FIG. 6 is a partial magnified sectional view showing that the hexagon wrench is fastened by a plate spring to keep the lock device released.

As shown in FIG. 6, the plate spring 90 includes an upper curved section 94a and a lower curved section 94b. The horizontal spacing distance of the upper curved section 94a is larger than the diameter of the hexagon wrench 60. The horizontal spacing distance of the lower curved section 94b corresponds to the diameter of the hexagon wrench 60. A fastening section 96 is formed between the upper curved section 94a and the lower curved section 94b. The horizontal spacing distance of the fastening section 96 is smaller than the diameter of the hexagon wrench 60 and is slightly expanded by the spring force of the plate spring 90.

The cylinder apparatus 10 according to the embodiment of the present invention is basically thus constructed. Operation, function and effect thereof will be explained below.

The cylinder apparatus 10 is fixed at a predetermined position by an unillustrated fixing means. Ends of unillustrated tubes are connected to the pair of pressure fluid inlet/outlet ports 42a, 42b. Other ends of the tubes are connected to an unillustrated pressure fluid supply source.

It is assumed that the pressure fluid is supplied to the pressure chamber 74 through the pressure fluid inlet/outlet port 42a under the energizing action of the unillustrated pressure fluid supply source, the release piston 72 moves upwardly, and the lock plate 54 is horizontal for the lock thereof to be released from the piston rod 18.

The unillustrated pressure fluid supply source is energized from the initial position as shown in FIG. 4. The pressure fluid (for example, compressed air) is introduced from the pressure fluid inlet/outlet port 42b into the lower cylinder chamber 14b of the piston 16. The piston 16 is pressed by the pressure fluid introduced into the lower cylinder chamber 14b. The piston 16 moves upwardly along the cylinder chamber 14 and reaches the displacement terminal end.

By contrast, when the pressure fluid is supplied from the pressure fluid inlet/outlet port 42a under the switching action of an unillustrated directional control valve, the piston 16 and the piston rod 18 move downwardly to return to the initial position.

The lock device 22 will be explained below which is operated to lock the piston rod 18 at a predetermined position.

When the pressure fluid inlet/outlet port 42a is opened to the atmospheric air by the switching action of the unillustrated directional control valve, the pressure fluid supplied to the pressure chamber 74 is released to the atmospheric air. The release piston 72 is displaced downwardly along the hole 70 by the spring force of the spring 66. Therefore, when the release piston 72 moves downwardly, the lock plate 54 is inclined by a predetermined angle about the support point of the support point pin 56. Then, the hole 52 of the lock plate 54 and the outer circumferential surface of the piston rod 18 are nipped together. Consequently, the piston rod 18 does not move.

Releasing the lock device 22 from the piston rod 18 will be explained in detail below.

In the locked state, the pressure fluid is supplied to the lower cylinder chamber 14b through the pressure fluid inlet/outlet port 42b. The piston rod 18 slightly moves upwardly. Accordingly, the hole 52 and the outer circumferential surface of the piston rod 18 are free from being nipped together. Then, the pressure fluid is switched to be supplied from the pressure fluid inlet/outlet port 42b to the pressure fluid inlet/outlet port 42a under the switching action of the unillustrated directional control valve.

The pressure fluid supplied to the pressure fluid inlet/outlet port 42a is introduced into the pressure chamber 74 through the third passage 80. The annular cutout 78 of the release piston 72 is thus pressed so that the release piston 72 can move upwardly. The fourth passage 82 communicating the upper cylinder chamber 14a is closed by the side wall of the release piston 72. Therefore, the pressure fluid is not supplied to the upper cylinder chamber 14a and the piston rod 18 does not downwardly move.

When the release piston 72 is moved upwardly by the pressure fluid supplied into the pressure chamber 74 and presses the lock plate 54 upwardly, the lock plate 54 inclined downward to the right is made horizontal about the support point of the support point pin 56. The horizontal lock plate 54 is free from engaging with the piston rod 18. Consequently, the lock plate 54 is released from the piston rod 18.

In emergency, the pressure fluid may cease to be supplied from the pressure fluid supply source for some reasons. In such emergency or maintenance, the lock on the piston rod 18 held at the predetermined position is kept released, which will be explained in detail below.

An operator externally inserts the hexagon wrench 60 along the lower curved section 94b of the plate spring 90 fastened to the through-hole 88 of the intermediate block member 28 as shown in FIG. 4. One end of the hexagon wrench 60 is inserted into the inserting hole 62 of the lock plate 54.

With the hexagon wrench 60 being connected to the lock plate 54 through the through-hole 88, the operator passes the hexagon wrench 60 through the fastening section 96. The spacing distance of the fastening section 96 is slightly expanded by the spring force of the plate spring 90. Therefore, the hexagon wrench 60 can move from the lower curved section 94b up to the upper curved section 94a. The upwardly moved hexagon wrench 60 is fastened by the fastening section 96. The fastening section 96 is formed between the upper curved section 94a and the lower curved section 94b and has the horizontal spacing distance smaller than the diameter of the hexagon wrench 60. Thus, the lock is kept released.

That is, the operator manually operates the hexagon wrench 60 connected coaxially to the axis of the lock plate 54. The hexagon wrench 60 can move from the lower curved section 94b up to the upper curved section 94a. The lock plate 54 is forcibly tilted by a predetermined angle about the support point of the support point pin 56 against the spring force of the spring 66.

The lock plate 54 inclined downward to the right is made horizontal against the spring force of the spring 66. The lock plate 54 is thus released from the piston rod 18. Then, the hexagon wrench 60 is fastened by the fastening section 96 of the plate spring 90. Accordingly, the lock plate 54 is kept horizontal for the lock thereof to be kept released from the piston rod 18.

According to the embodiment of the present invention, the plate spring 90 is installed to the through-hole 88 defined at the side surface of the intermediate block member 28. The hexagon wrench 60 connected to the lock plate 54 is fastened by the fastening section 96 of the plate spring 90. With the simple and convenient structure, the lock device can be kept released with ease for a desired period of time.

Unlike the conventional technique, the operator does not need to continuously apply the force against the spring force with one hand so as to keep the lock device released. Therefore, the maintenance operation or the like can be efficiently performed in a short period of time.

Figure 7:
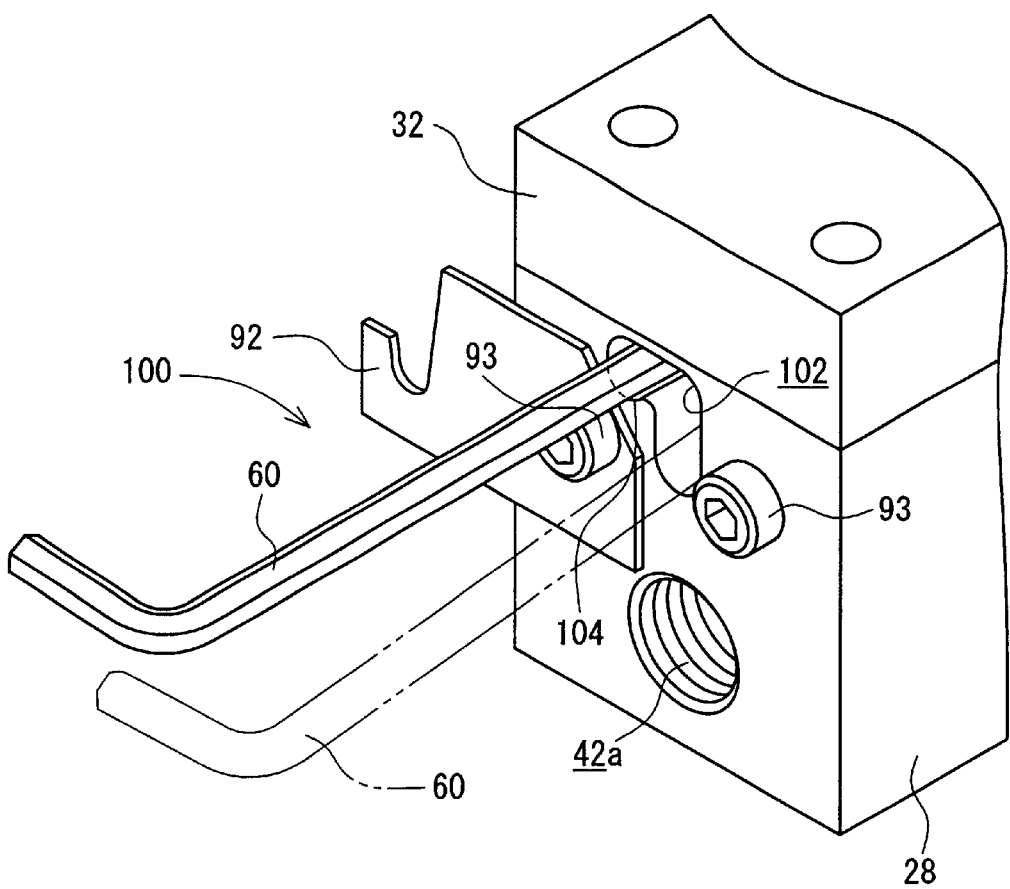
FIG. 7 is, with partial omission, a perspective view of a mechanism for keeping a lock device released according to another embodiment.
Figure 8:
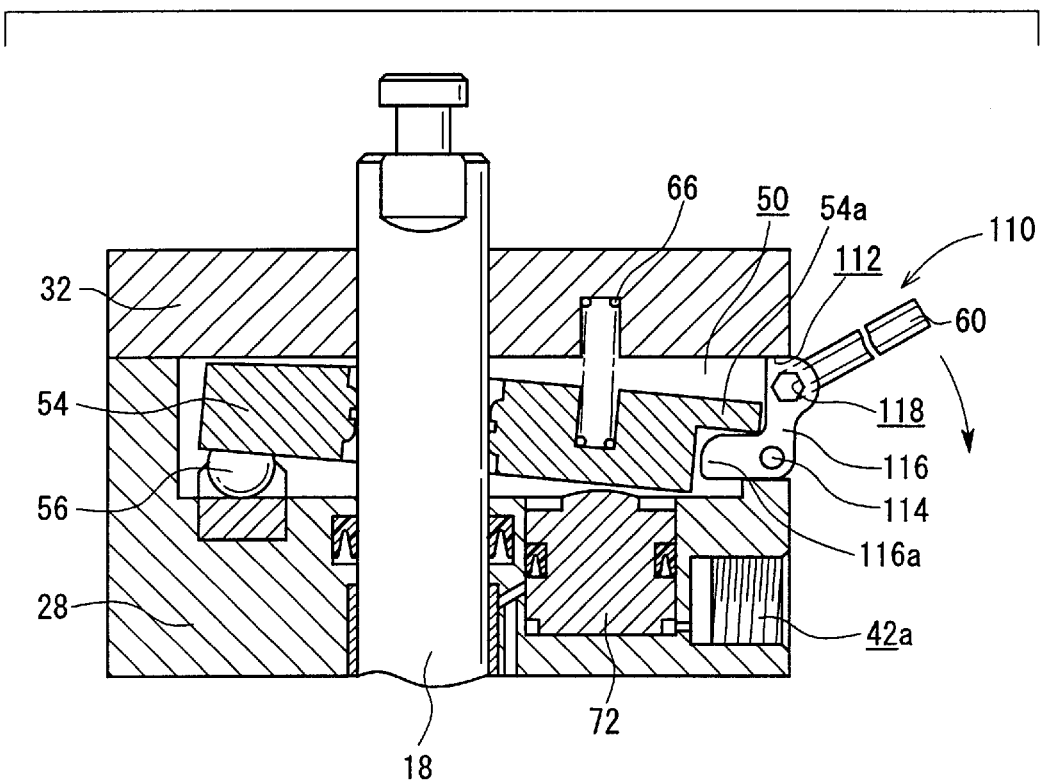
FIG. 8 is, with partial omission, a vertical sectional view of a mechanism for keeping a lock device released according to still another embodiment.
Figure 9:
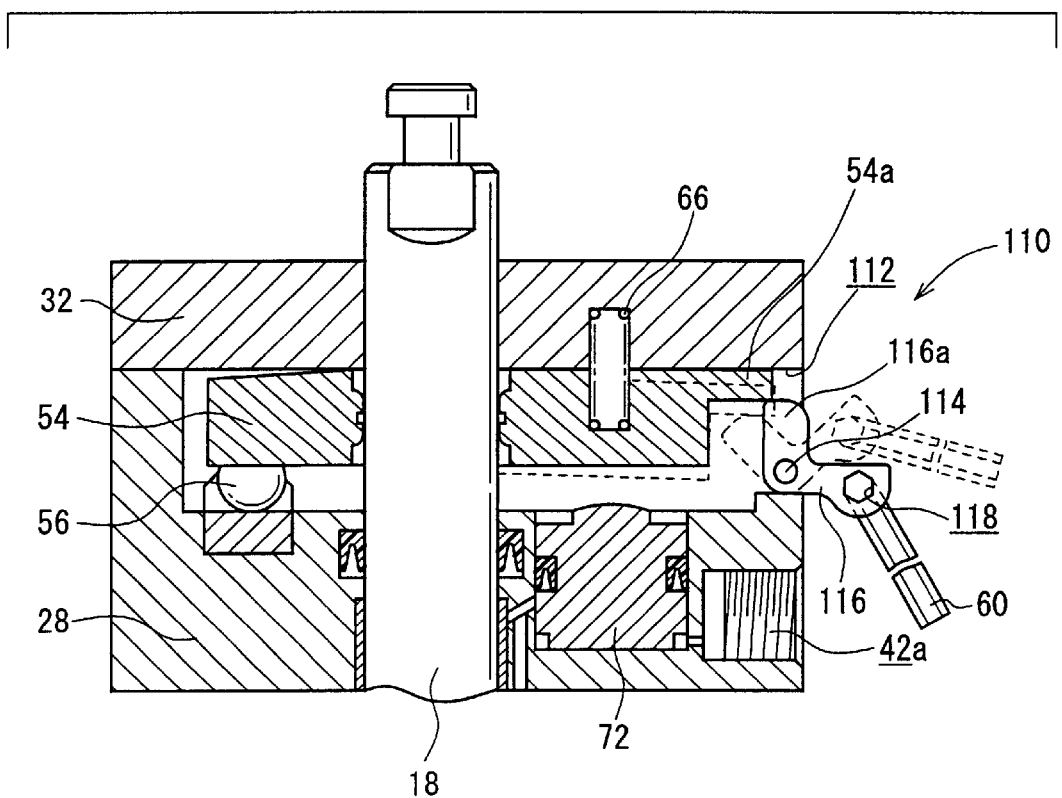
FIG. 9 is, with partial omission, a vertical sectional view showing a tilting member shown in FIG. 8 is tilted to keep the lock device released.

Other embodiments of the mechanism 24 are shown in FIGS. 7 to 9. The same components as that shown in FIG. 3 are designated by the same reference numerals. Detailed explanation thereof will be omitted.

As shown in FIG. 7, a mechanism 100 for keeping a lock released according to another embodiment is different from the mechanism 24 shown in FIG. 3. Specifically, a through-hole 102 (fastening member) having a L-shaped cross section is defined instead of the plate spring 90 for fastening the hexagon wrench 60.

In the above arrangement, the hexagon wrench 60 linearly moves upwardly along the through-hole 102 having the L-shaped cross section. Then, the hexagon wrench 60 slightly slides laterally and is fastened to a curved fastening section 104. Thus, the lock is kept released.

As shown in FIGS. 8 and 9, a mechanism 110 for keeping a lock released according to still another embodiment is different from the mechanism 24 shown in FIG. 3. Specifically, a tilting member 116 is disposed. The tilting member 116 closes an opening 112 defined at the side surface of the intermediate block member 28 and is tiltable by a predetermined angle about the support point of a pin 114.

The tilting member 116 has a bent section 116a engagable with a projection 54a of a lock plate 54, and a hole 118 having a hexagonal cross section for inserting the forward end of the hexagon wrench 60 thereinto. An operator inserts the bent forward end of the hexagon wrench 60 into the hole 118. The tilting member 116 is tilted about the support point of the pin 114 by a predetermined angle in the direction indicated by an arrow. Accordingly, the bent section 116a presses the projection 54a of the lock plate 54 upwardly. As a result, as shown in FIG. 9, the lock plate 54 is made horizontal and is kept released.

The other function and effect are the same as those of the mechanism 24 shown in FIG. 3. Detailed explanation thereof is omitted.

The embodiments of the present invention have been explained by using the cylinder apparatus 10. Alternatively, the mechanism 24 may be applied to an unillustrated clamp device and an unillustrated clamp unit.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A mechanism for keeping a lock device released from a movable member, said mechanism comprising:
   a casing which accommodates said lock device and which has a manual operation hole defined in a side surface of said casing;
   a piston accommodated in a chamber defined in said casing, said piston being connected to said movable member for reciprocally moving said movable member in accordance with supply of a fluid under pressure to said chamber:
   a connecting member which is inserted externally through said manual operation hole and which is connected to a lock member of said lock device; and
   a fastening member which enables displacement of said lock member by said connecting member for releasing said lock device from said movable member and which fastens said connecting member with said lock device being kept released from said movable member.

2. The mechanism according to claim 1, wherein said connecting member includes a rod-shaped member and has an end inserted into an inserting hole of said lock member for operating said lock member.

3. The mechanism according to claim 1, wherein a cover member for opening and closing said manual operation hole is disposed on said side surface of said casing.

4. The mechanism according to claim 1, wherein said fastening member is composed of a plate spring having a fastening section for fastening said connecting member.

5. The mechanism according to claim 4, wherein said plate spring has a composite circular configuration being a combination of a first curved section and a second curved section, said first curved section having a substantially horizontal spacing distance larger than a diameter of said connecting member and said second curved section having a substantially horizontal spacing distance corresponding to said diameter of said connecting member.

6. The mechanism according to claim 1, wherein said fastening member has a through-hole which is defined through said side surface of said casing and which has a fastening section for fastening said connecting member.

7. The mechanism according to claim 6, wherein said through-hole has a cross section of a substantially L-shape, said fastening section comprising one leg of said L-shaped through hole, wherein said lock device is kept released from said movable member when said connecting member is positioned in said one leg.

8. A mechanism for keeping a lock device released from a movable member, said mechanism comprising:
   a casing which accommodates said look device and which has an opening defined in a side surface of said casing;
   a piston accommodated in a chamber defined in said casing, said piston being connected to said movable member for reciprocally moving said movable member in accordance with supply of a fluid under pressure to said chamber; and
   a tilting member which is disposed in said opening and which pivots by a predetermined angle about a support point of a pin also disposed in said opening, so that a lock member of said lock device can be displaced for keeping said lock device released from said movable member.

9. The mechanism according to claim 8, wherein said tilting member has a bent section engageable with a projection of said lock member, and a hole for inserting a connecting member thereinto.

10. The mechanism according to claim 1, wherein said lock member comprises a lock plate tiltable about a support point pin, said lock plate having a through hole, and said movable member comprises a piston rod inserted in said through hole and having an end which extends outside said casing, and further comprising a spring disposed in said casing for pressing said lock plate on a side opposite from said support point pin.

11. The mechanism according to claim 8, wherein said lock member comprises a lock plate tiltable about a support point pin, said lock plate having a through hole, and said movable member comprises a piston rod inserted in said through hole and having an end which extends outside said casing, and further comprising a spring disposed in said casing for pressing said lock plate on a side opposite from said support point pin.

12. A mechanism for keeping a lock device released from a movable member, said mechanism comprising:
   a casing which accommodates said lock device and which has a manual operation hole defined in a side surface of said casing;
   a connecting member which is inserted externally through said manual operation hole and which is connected to a lock member of said lock device; and
   a fastening member which enables displacement of said lock member by said connecting member for releasing said lock device from said movable member and which fastens said connecting member with said lock device being kept released from said movable member,
   wherein said fastening member is composed of a plate spring having a fastening section for fastening said connecting member, said plate spring having a composite circular configuration being a combination of a first curved section and a second curved section, said first curved section having a substantially horizontal spacing distance larger than a diameter of said connecting member and said second curved section having a substantially horizontal spacing distance corresponding to said diameter of said connecting member.

13. The mechanism according to claim 12, wherein said connecting member includes a rod-shaped member and has an end inserted into an inserting hole of said lock member for operating said lock member.

14. The mechanism according to claim 12, wherein a cover member for opening and closing said manual operation hole is disposed on said side surface of said casing.

* * * * *